United States Patent [19]

Kompelien et al.

[11] 4,423,364

[45] Dec. 27, 1983

[54] ELECTRIC MOTOR DAMPER DRIVE WITH BACKUP POWER PACK

[75] Inventors: Arlon D. Kompelien, Richfield; Curtis E. Westley, St. Louis Park, both of Minn.

[73] Assignee: Honeywell Inc., Minneapolis, Minn.

[21] Appl. No.: 362,590

[22] Filed: Mar. 29, 1982

[51] Int. Cl.³ .............................................. H02P 7/18
[52] U.S. Cl. .................................. 318/440; 318/107; 318/441
[58] Field of Search ............... 318/440, 441, 471, 107, 318/106, 105, 280

[56] References Cited

U.S. PATENT DOCUMENTS

| | | | |
|---|---|---|---|
| 3,012,510 | 12/1961 | Kusner | 318/107 |
| 3,743,442 | 7/1973 | Wilson | 318/440 |
| 3,863,121 | 1/1975 | Godard et al. | 318/440 |

Primary Examiner—J. V. Truhe
Assistant Examiner—Arthur G. Evans
Attorney, Agent, or Firm—Charles L. Rubow

[57] ABSTRACT

An electric damper motor drive with a backup power pack is disclosed comprising a reversible electric motor operable in first and second opposite directions in response to first and second distinct forms of electrical energization, respectively. A primary power source normally supplies electrical power to energize the motor in response to a sensed environmental condition. A backup power pack is responsive to the absence of power from the primary power source to supply the first form of electrical energization to drive the motor in the first direction to a predetermined position.

17 Claims, 3 Drawing Figures

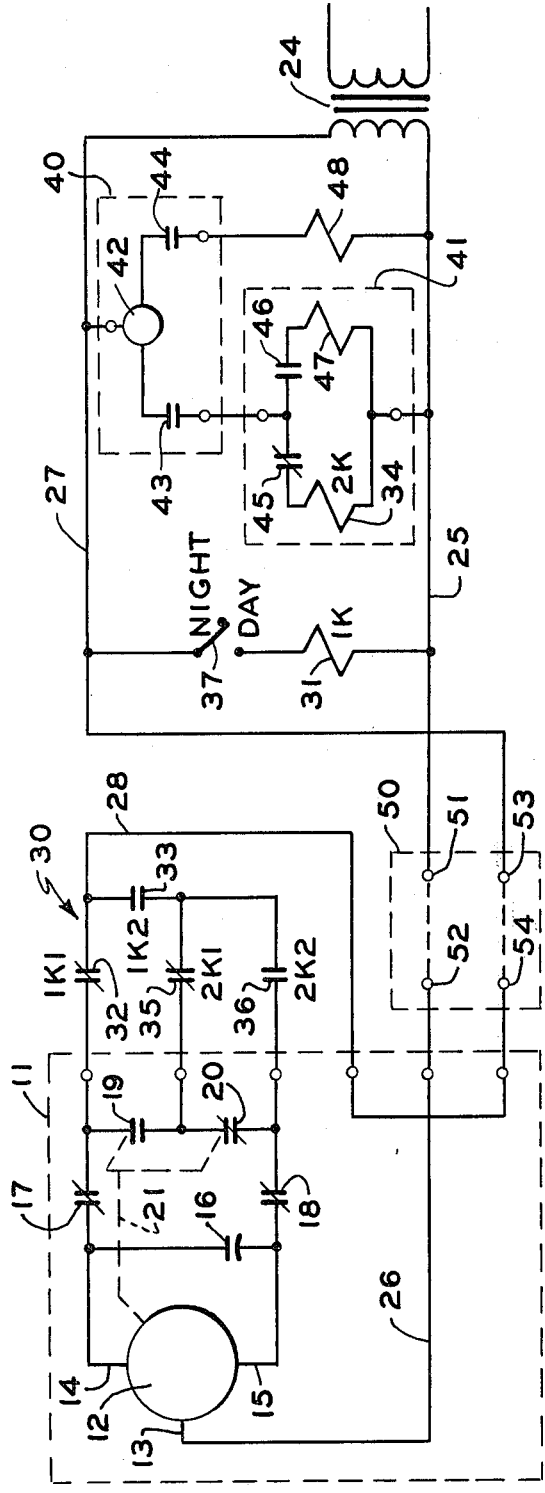

ELECTRIC MOTOR DAMPER DRIVE WITH BACKUP POWER PACK

BACKGROUND OF THE INVENTION

The invention disclosed herein relates generally to electric motor actuators for condition changing means, such as dampers in air conditioning systems, and more particularly to backup energization apparatus for such actuators for returning the condition changing means to a predetermined state in the event of primary power failure.

In ventilating and air conditioning systems, it is common to utilize dampers and/or valves for controlling the temperature, humidity, and distribution of a fluid medium used in controlling conditions in an air conditioned space. Where air is used as the fluid medium, dampers may be used for mixing varying proportions of air at different temperatures and/or humidities within the air conditioning system, mixing air within the system with variable amounts of outside air for achieving operating economies, and distributing conditioned air to areas within the conditioned space.

The dampers and/or valves are frequently positioned by means of either single direction or reversible electric motors. The motors are powered from an available primary power source such as electrical current supplied by a public utility. This electrical power is supplied to the motors under the control of one or more condition responsive sensors, such as thermostats, enthalpy sensors, etc., so as to achieve the desired conditions in the air conditioned space, and to do so economically.

In installations employing a single-direction motor, the motor is used to move the damper or similar device toward one position, and a return spring is typically used to achieve movement in the opposite direction. Gearing on the motor is normally such that the spring is unable to return the damper as long as the motor is mechanically engaged. Thus, when it is desired to move the damper in a direction opposite that produced by motor operation, a clutch between the motor and the damper is disengaged to permit the spring to return the damper to a predetermined position.

An additional function which may be performed by the spring return apparatus is to position the damper at a predetermined desired position in the event of primary power failure. For example, it may be desirable or required to position an economizer damper which admits outside air to an air conditioning system to a predetermined minimum or closed position in the event of primary power failure. This may be necessary to prevent the admission of unacceptably cold outside air which could freeze water pipes and do other damage, and/or to minimize other adverse effects on conditions within the conditioned space.

In installations in which a reversible electric motor is employed, the damper may be moved in either direction under the power of the motor. However, even with a reversible motor, spring return apparatus is frequently employed to achieve appropriate positioning of the damper in the event of primary power failure.

As previously indicated, the use of a clutch in electric motor/return spring systems is necessary to mechanically disengage the motor so as to permit the spring to position the attached damper. A motor mechanism must be especially adapted for use with and to include a return spring and associated clutch. Therefore, in situations in which it is desired to replace an existing non-spring return unit with one having a return feature, it is necessary to replace the entire unit. Since it is not always known at the outset whether spring return operation will be required, and since it sometimes becomes necessary after the initial installation to add the return feature, it would be advantageous to be able to use the same motor actuator regardless of whether the return feature might be required, and to provide the return feature, if required, by a simple field addition.

An additional characteristic which is inherent in motor actuators with spring return mechanisms is that the motor must be sufficiently powerful in at least one direction to both operate the attached damper and to wind the return spring. This requires a motor which is larger and more expensive than necessary to achieve the basic purpose of positioning the damper.

SUMMARY OF THE INVENTION

An electric motor actuator with a backup power pack in accordance with this invention basically comprises a reversible electric motor and a control system for supplying electrical energization from a primary power source, the electrical energization being characterized in either of two ways in response to a sensed environmental condition to operate the motor in either of first and second directions respectively. The primary power source is connected to the motor through switching means which, in the absence of electrical power from the primary power source, assumes a configuration for supplying electrical energization characterized in the first way. The backup power pack is also responsive to the absence of power from the primary power source to supply electrical energization to the motor through the switching means.

The backup power pack may include a rechargable battery and a charging circuit for providing charging current to the battery when electrical power from the primary power source is available, and timing means for disconnecting at least a portion of the remainder of the backup power pack from the battery after sufficient time has elapsed to permit the motor to return to a predetermined position upon primary power failure.

DESCRIPTION OF THE DRAWINGS

FIG. 1 is a schematic diagram, partially in block form, of a motor drive system including a backup power pack in accordance with the applicants' invention;

FIG. 2 is a schematic electrical diagram of a backup power pack suitable for use in the system of FIG. 1; and FIG. 3 is a functional block diagram of an integrated logic circuit used in the backup power pack shown in FIG. 2.

DESCRIPTION OF THE PREFERRED EMBODIMENT

In the motor drive system illustrated in FIG. 1, reference numeral 11 represents a modular motor drive assembly including a motor 12 with associated gearing for producing a rotary output of appropriate speed and torque characteristics for positioning a damper, valve or other similar device. Motor 12 is a reversible motor having three input terminals identified by reference numerals 13, 14, and 15. Terminal 13 is common and is directly energized for either direction of motor operation. A phase shift capacitor 16 is connected between terminals 14 and 15. Motor 12 and capacitor 16 may be collectively referred to as reversible electric motor means. The direction of motor operation is determined by which of terminals 14 and 15 is energized through the capacitor 16. The capacitor introduces a phase lag into the voltage at the terminal to which it supplies current, and thus, characterizes the electrical energization supplied to the motor in one of two ways depending on which terminal is connected to receive current from the capacitor.

Reference numerals 17 and 18 identify limit switches which establish the limits of rotation in both directions of motor 12. The limits established by switches 17 and 18 represent two stable positions of motor 12. A third position, intermediate the positions established by switches 17 and 18, is established by switches 19 and 20 which are mechanically connected to the output of motor 12 as indicated by dashed lines 21. The purpose of the third position is to provide some minimum operating condition for normal operation of the system in which drive assembly 11 is used.

Primary electrical power for operation of the motor drive assembly may be supplied by an electrical utility to the primary winding of a transformer identified by reference numeral 24. One end of the secondary winding of transformer 24 is connected to terminal 13 of motor 12 by means of conductors 25 and 26. The other end of the secondary winding of transformers 24 is connected to one of terminals 14 and 15 directly, and to the other of terminals 14 and 15 through capacitor 16 by means of conductors 27 and 28.

Which of terminals 14 and 15 is connected directly, and which is connected through capacitor 16 is determined by switching means generally identified by reference numeral 30. As shown in FIG. 1, switching means 30 comprises a pair of relays each having two sets of contacts. One relay identified by designator 1K includes a relay coil 31, a normally closed set of contacts 32 and normally open set of contacts 33. A second relay identified by designator 2K, includes a relay coil 34, a normally closed set of contacts 35 and normally open set of contacts 36. For convenience in describing the present invention, capacitor 16 and switching means 30 may be collectively referred to as characterization means.

Relay coil 31 is connected through a "Day/Night" switch 37 across the secondary winding of transformer 24. In the "Night" setting, relay coil 31 is not energized. Therefore, relay contacts 32 remain closed and terminals 14 and 15 of motor 12 are energized so as to move the damper driven by motor 12 to its fully closed limiting position. With switch 37 set to its closed or "Day" setting, relay contacts 33 are closed so as to drive motor 12 to either its open or minimum operating position, depending on whether relay contacts 35 and 36 are respectively closed and opened or vice versa. The state of relay contacts 35 and 36 is determined by a thermostat identified by reference numeral 40 and an enthalpy control identified by reference numeral 41, or other suitable condition sensing apparatus.

As illustrated, thermostat 40 is a type of thermostat used in two-stage air conditioning apparatus. An example of such a thermostat is a Model T872 thermostat commercially marketed by Honeywell Inc. It contains a temperature set point adjustment and temperature sensing element together identified by reference numeral 42, a first set of contacts 43 and a second set of contacts 44. Contacts 43 are connected to enthalpy control 41 which senses the enthalpy of air outside the conditioned space. Enthalpy control 41 includes a normally closed set of contacts 45 connected to relay coil 34. In operation, if thermostat 40 calls for cooling, thus closing contacts 43, and enthalpy control 41 senses that outside air can be advantageously used for cooling purposes, contacts 45 remain closed and energize relay coil 34. This results in closure of contacts 36, thus energizing motor 12 to drive the damper to its full open position. Conversely, if enthalpy control 41 senses that the enthalpy of the outside air is such that the air cannot be advantageously used for cooling, and that mechanical cooling is required, contacts 46 are closed, thus energizing coil 47 of a relay which energizes a first air conditioning stage. If temperature in a conditioned space continues to rise, resulting in closure of thermostat contacts 44, a coil 48 of a relay controlling a second stage of air conditioning is energized.

As so far described, in the event of primary power failure, all relay contacts would return to their normal states. Further, since there would be no power to energize motor 12, the damper attached thereto would remain in its position at the time of power failure. Such a condition could have adverse consequences if the damper were positioned to admit outside air and the outside temperature dropped to the point of adversely lowering the temperature within the conditioned space. It is possible to avoid such a situation by providing a spring return and associated clutch between motor 12 and the damper controlled thereby. However, as previously indicated, this requires a special motor module designed and built with a spring return and clutch. The spring return feature cannot be easily added to an existing motor drive unit in the field. Further, if a spring return feature is provided, the motor must be large enough not only to position the damper, but also to wind the return spring. The applicants have devised a backup power pack which can be conveniently used with an existing motor drive unit to provide return to a predetermined position mode for motor 12. The backup power pack is electrically connected between conductors 25 and 26 and between conductors 27 and 28, and is shown in block form by dashed line block 50. The details of backup power pack 50 are shown in schematic form in FIG. 2.

As shown in FIG. 2, primary electrical energization is supplied between terminals 51 and 53. Presence of primary power is sensed by relay coil 56 of a relay 3K which has a normally closed set of contacts 57 and a normally open set of contacts 58. Contacts 58 are connected in series with a first winding 59 of a transformer generally identified by reference numeral 60. When primary power is available, relay contacts 58 are closed, thus supplying electrical energization through transformer 60 to circuitry connected to a second winding 61 of the transformer. In this mode of operation, winding 61 is used to supply charging current to a rechargable battery 62. The charging circuitry comprises a center tap 63 on winding 61 which is connected to the positive terminal of battery 62. The ends of winding 61 are connected through a half wave rectifier bridge comprising diodes 64 and 65 to the negative terminal of battery 62 through a resistor 66. Since energization of relay coil 56 results in opening of relay contacts 57, the remaining circuitry in FIG. 2 is electrically disconnected when primary power is available.

In the event that the supply of primary power ceases, relay 3K returns to its normal state, thus closing contacts 57 and opening contacts 58. This results in electrical disconnection of transformer winding 59 from the primary power conductors. It also results in the connection of the positive terminal of battery 62 to a bus 70 so as to energize the remaining circuitry in FIG. 2.

In this mode of operation, a crystal oscillator, comprising a crystal 71 and capacitors 72 and 73, supplies an oscillating signal to an integrated logic circuit identified by reference numeral 74. Integrated circuit 74, whose function will be described in greater detail in connection with FIG. 3, supplies a square-wave output signal having a repetition rate approximately equal to the frequency of the primary power between its output terminals 3 and 4. This signal is supplied to the bases of a pair of transistors 75 and 76 which, in combination with transistors 77–80 and resistors 81–84, form an amplifier. The output of the amplifier appears between the collectors of transistors 79 and 80, and is supplied between intermediate taps 85 and 86 on transformer winding 61.

The square-wave signals supplied between taps 85 and 86 is rounded somewhat by the inductance of the transformer and coupled through the transformer to winding 59 which is connected across terminals 52 and 54 to supply electrical energization to motor drive assembly 11. Since the contacts of relays 1K and 2K are in their normal states because of the absence of primary electrical power, motor 12 is driven to a position which fully closes the damper connected to the motor. Thus, in the event of primary power failure, motor 12 and the damper connected thereto are always returned to a predetermined position.

The functions provided by integrated circuit 74 may be ascertained from a study of FIG. 3. Circuit 74 contains circuitry 90 which, in combination with crystal 71 and capacitors 72 and 73, forms an oscillator which supplies a relatively high frequency square-wave signal to a counter 91 and a frequency divider 92. Frequency divider 92 produces an output signal having approximately the same repetition rate as the frequency of the primary power. The output of frequency divider 92 is supplied directly to one input of a first AND gate 93, and through an inverter 94 to one input of a second AND gate 95. The output of counter 91 is connected to the second inputs of AND gates 93 and 95 through an inverter 96. Counter 91 also receives an input from a reset circuit 97 which resets the counter each time power is supplied to integrated circuit 74, indicating primary power failure.

Counter 91 supplies an output through inverter 96 to AND gates 93 and 95 for a predetermined period of time determined by the counter. Thus, a square-wave signal is provided between the outputs of AND gates 93 and 95 for the period of time determined by counter 91. The period of time established by counter 91 is set slightly longer than the maximum time required for motor 12 to return to a fully closed position. Thus, after motor 12 is provided with backup power for sufficient time to return to a closed position, the signal to the bases of transistor 75 and 76 is discontinued, thus minimizing the current drain on battery 62.

Although a preferred embodiment of the applicants' electric motor actuator with a backup power pack has been illustrated and described in detail, numerous variants and alternative embodiments in accordance with the teachings herein will be apparent to those skilled in the art. The scope of coverage sought for this invention is not to be limited to the disclosed embodiment, but only by the terms of the appended claims.

The embodiments of the invention in which an exclusive property or right is claimed are defined as follows:

1. A condition responsive control system adapted to control condition changing means, comprising:
   an air duct for admitting outside air to an air conditioned space;
   a reversible electric motor operable in first and second opposite directions in response to electrical energization;
   a damper in said air duct actuated by said reversible electric motor for controlling the amount of air admitted through said duct;
   a control circuit responsive to a sensed environmental condition in the air conditioned space for selectively supplying electrical power from a primary source to energize said reversible electric motor for operation in the first or second directions depending on the sensed condition; and
   backup power pack means responsive to the absence of power from the primary power source to supply electrical energization to said reversible electric motor to drive said motor only in the first direction.

2. A condition responsive control system comprising:
   reversible AC electric motor means having first, second and third terminals, said motor means operating in a first direction in response to AC energization supplied between the first and second terminals and operating in a second direction in response to AC energization supplied between the first and third terminals;
   AC power supply means having first and second terminals of which the first terminal is connected to the first terminal of said motor means;
   a first switching relay having an input terminal connected to the second terminal of said motor means through a first set of normally closed contacts and connected to the third terminal of said motor means through a second set of normally open contacts, said first switching relay being actuatable to a state in which the first set of contacts is open and the second set of contacts is closed;
   condition sensing means energized from said AC power supply means and operable when energized and a predetermined condition is sensed to actuate said first switching relay;
   a backup AC power source having first and second terminals of which the first terminal is connected to the first terminal of said motor means; and
   a second switching relay connecting the input terminal of said first switching relay to the second terminal of said AC power supply means through a third set of normally open contacts, and to said backup AC power source through a fourth set of normally closed contacts, said second switching relay being responsive to energization from said AC power supply means to close the third set of contacts and open the fourth set of contacts.

3. The condition responsive control system of claim 1 wherein:
   said reversible electric motor is operable in the first and second directions in response to electrical energization characterized in first and second ways respectively;
   said control circuit is responsive to a sensed environmental condition in the air conditioned space, an environmental condition set point and the presence of electrical power from the primary power source to supply electrical energization characterized in either of the first and second ways depending on the relationship between the set point and sensed condition; and said backup power pack means is operable to supply only electrical energization characterized in the first way.

4. The condition responsive control system of claim 3 wherein said backup power means comrpises:

a backup power pack operable to supply electrical energization in response to the absence of power from the primary power source; and characterization means connected to receive energization from said backup power pack and operable to characterize the electrical energization in the first way in response to absence of power from the primary power source.

5. The condition responsive control system of claim 1, 3 or 4 wherein said backup power pack means comprises a rechargable battery and recharging circuitry for supply charging current to said rechargable battery in response to the presence of power from the primary power source.

6. The condition responsive control system of claim 1, 3 or 4 wherein:

the primary power source supplies and said reversible electrical motor is energizable by alternating electrical current;

said control circuit includes a first current path connecting the said primary power source to a terminal common to each of first and second pairs of terminals of said reversible electric motor and first switching means for connecting said primary power source to the second terminal of either of the first and second pairs of terminals depending on the state of said switching means, said first switching means being configured to provide a closed electrical path between said primary power source and the second terminal of said first pair of terminals of the motor in the absence of electrical power from said primary power source;

phase shifting means is connected between second terminals of the first and second pairs of terminals of said reversible electric motor; and said backup power pack includes a rechargable battery, electrical power conditioning circuitry for converting the output of said rechargable battery to alternating electrical current suitable for energizing said reversible electric motor and second switching means operable to connect the output of said power conditioning circuitry through said first switching means to the first pair of terminals of said motor in the absence of electrical power from the primary power source.

7. The condition responsive control system of claim 6 wherein:

said reversible electric motor is operable to move to a predetermined position within a first predetermined period of time; and said backup power pack includes timer means which disconnects at least a portion of the electrical power conditioning circuitry from said rechargable battery after a second predetermined period of time at least as long as the first predetermined period of time from discontinuance of electrical power from the primary power source, whereby electrical drain from said rechargable battery is reduced.

8. A condition responsive control system comprising:

a motor adapted to operate in first and second directions in response to energization characterized in first and second ways respectively;

first and second source means for furnishing power from first and second sources respectively;

first switching means connected to supply energization to said motor, said first switching means having first and second states in which the energization is characterized in the first and second ways respectively, said first switching means being adapted to assume the first state in the absence of power from said first source means; and second switching means connecting said first and second source means to said first switching means, said second switching means having first and second states in which it is adapted to supply power to said first switching means from said first and second source means respectively in response to the presence or absence respectively of power from said first source means.

9. The condition responsive control system of claim 8 wherein said first switching means comprises:

a first relay having an actuator which, when unenergized, causes said first switching means to assume the first state, and, when energized, causes said first switching means to assume the second state; and control means operable to energize the actuator of said first relay only when receiving power from said first source.

10. The condition responsive control system of claim 9 wherein said control means includes a sensor and is operable to energize the actuator of said first relay only when receiving power from said first source means and a predetermined condition is sensed.

11. The condition responsive control system of claim 10 wherein:

said sensor is operable to sense an environmental condition;

environmental control apparatus is provided for varying the sensed environmental condition; and said motor is connected to operate said environmental control apparatus.

12. The condition responsive control system of claim 11 wherein said control means is responsive to the sensed environmental condition and a setpoint value.

13. The condition responive control system of claim 12 wherein an air duct is provided for admitting outside air into an air conditioned space;

said environmental control apparatus is a damper in said air duct; and said sensor senses a temperature in the air conditioned space.

14. The condition responsive control system of claim 9 wherein:

said first and second source means furnish alternating current electric power;

said motor is a reversible alternating current electric motor having a first terminal connected to said first and second source means, and second and third terminals, electric current supplied between the first and second terminals causing said motor to operate in the first direction and electric current supplied between the first and third terminals causing said motor to operate in the second direction;

said first relay, in its first state, is adapted to conduct current to the second terminal of said motor, and, in its second state, is adapted to conduct current to the third terminal of said motor; and said second switching means comprises a second relay having an actuator which, when unenergized, causes said second switching means to assume its first state in which said second relay is adapted to conduct current from said second source means to said first relay, and, when energized, causes said second switching means to assume its second state in which said second relay is adapted to conduct current from said first source means to said first relay.

15. The condition responsive control system of claim 14 wherein said second source means comprises a rechargeable battery and power conditioning circuitry, said battery being connected to said power conditioning circuitry through a set of normally closed contacts of said second relay, whereby presence of electrical power from said first source means results in opening of said set of contacts and disconnection of said rechargeable battery from said power conditioning circuitry.

16. The condition responsive control system of claim 15 wherein:

said motor is operable to move from any position within its range of movement to a predetermined position in less than predetermined period of time; and said second source means includes timer means which disconnects at least a portion of said power conditioning circuitry from said rechargeable battery after a period of time at least as long as the predetermined period has elapsed following interruption of power from said first source means, whereby electrical drain from said rechargeable battery is reduced.

17. A backup power pack for an electric motor drive system including reversible electric motor means having first and second terminals, said motor means operating in one one direction when appropriately characterized electrical energization is supplied to the first terminal and operating in a second direction when appropriately characterized electrical energization is supplied to the second terminal, said drive system further including power supply means for supplying appropriately characterized electrical energization, and first switching means having a preferred state in which it is adapted to conduct energization to the first terminal and a further state in which it is responsive to the presence of energization from said power supply means and to a sensed condition for conducting energization to the first or second terminal depending on the state of the sensed condition, said backup power pack comprising:

a backup power source adapted to supply appropriately characterized electrical energization in the absence of electrical energization from said power supply means; and second switching means for connecting either said power supply means or said backup power source to said first switching means, said second switching means being responsive to electrical energization from said power supply means to conduct energization from said power supply means to said first switching means and responsive to the absence of electrical energization from said power supply means to conduct energization from said backup power source to said first switching means.

* * * * *